United States Patent
Hutchinson

[11] Patent Number: 6,119,590
[45] Date of Patent: *Sep. 19, 2000

[54] HEAT SEALING APPARATUS FOR PLASTIC BAGS

[75] Inventor: Harold D. Hutchinson, Oxnard, Calif.

[73] Assignee: Harwil Corporation, Oxnard, Calif.

[ * ] Notice: This patent is subject to a terminal disclaimer.

[21] Appl. No.: 09/358,152

[22] Filed: Jul. 20, 1999

Related U.S. Application Data

[63] Continuation of application No. 09/087,752, May 29, 1998, Pat. No. 5,947,019.

[51] Int. Cl.[7] .................................................. B30B 15/34
[52] U.S. Cl. .......................... 100/320; 100/326; 156/579
[58] Field of Search .......................... 100/315, 319–321, 100/326; 156/579

[56] References Cited

U.S. PATENT DOCUMENTS

| | | | |
|---|---|---|---|
| 2,638,964 | 5/1953 | Andina | 100/321 |
| 3,106,630 | 10/1963 | Klamp | 100/321 |
| 3,165,622 | 1/1965 | Marzec | 100/320 |
| 3,236,174 | 2/1966 | Hutchinson et al. | 100/319 |
| 3,375,777 | 4/1968 | Techtmann et al. | 100/321 |
| 3,721,602 | 3/1973 | Bosse | 100/320 |
| 3,779,838 | 12/1973 | Wech | 100/320 |
| 4,431,474 | 2/1984 | Groneck et al. | 100/326 |
| 5,266,150 | 11/1993 | Miller | 100/321 |
| 5,826,503 | 10/1998 | Hutchinson | 100/320 |
| 5,947,019 | 9/1999 | Hutchinson | 100/320 |

FOREIGN PATENT DOCUMENTS 5-124109  5/1993  Japan ................................ 100/320

*Primary Examiner*—Stephen F. Gerrity
*Attorney, Agent, or Firm*—David O'Reilly

[57] ABSTRACT

An improved plastic bag sealing apparatus comprised of an improved resilient planar heater formed of a heating wire embedded in a resilient silicon rubber material. The heater is shaped to conform to the flat planar surface of a T-bar shaped heating element, and clamped in place with insulators to provide maximum transfer of heat to a heating edge formed by the web portion of the T-bar. In an optional configuration the heater is in the form of a tubular rod seated in a channel in the T-bar directly above the heating edge for transferring maximum heat to the heating edge. The containment of heat and transfer of maximum heat to the T-bar permits a substantial improvement in thermal efficiency and a substantial reduction of power consumption. The heating edge of the T-bar is covered with an easily replaceable heating channel coated with a non-stick, heat resistant material such as polytetraflouroethylene (TEFLON).

16 Claims, 6 Drawing Sheets

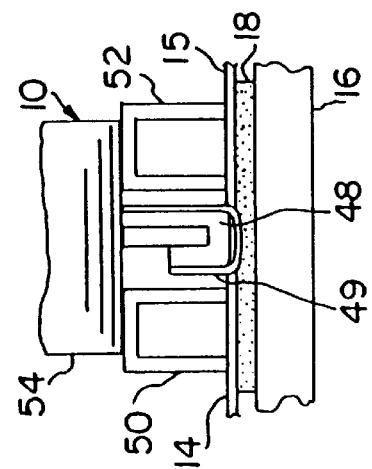
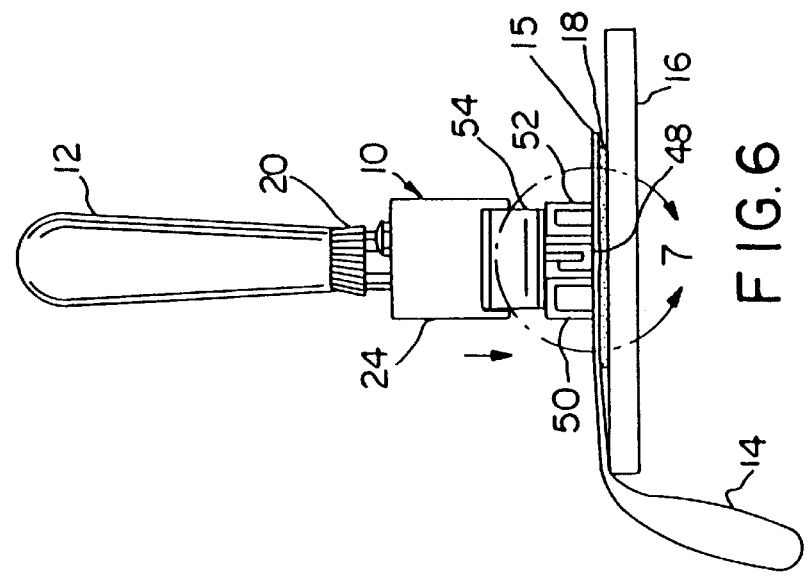
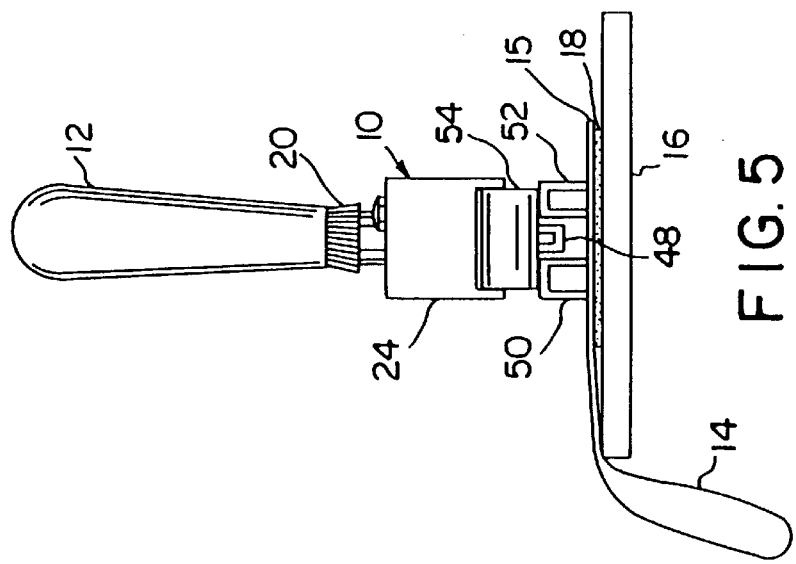
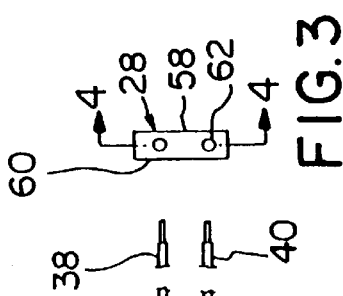
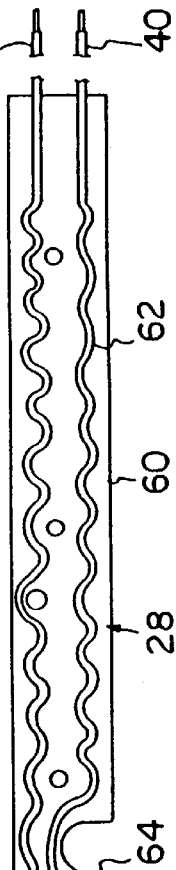

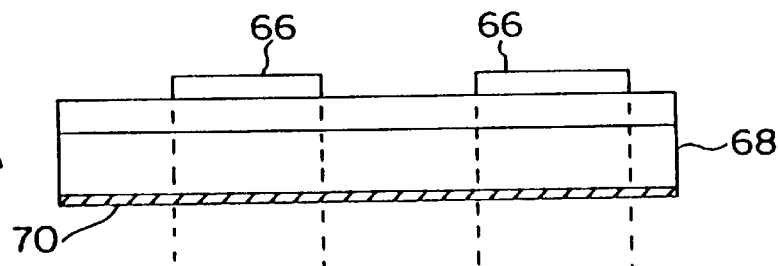
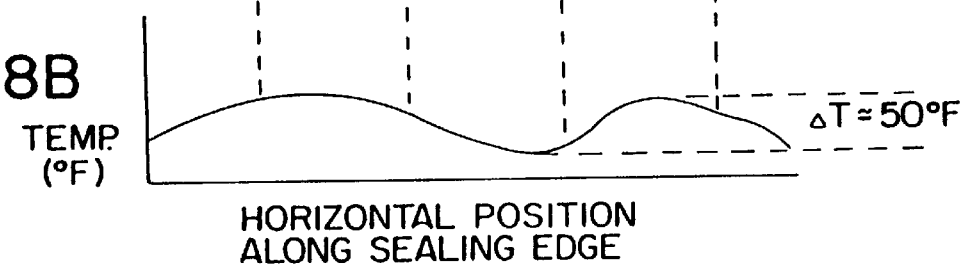
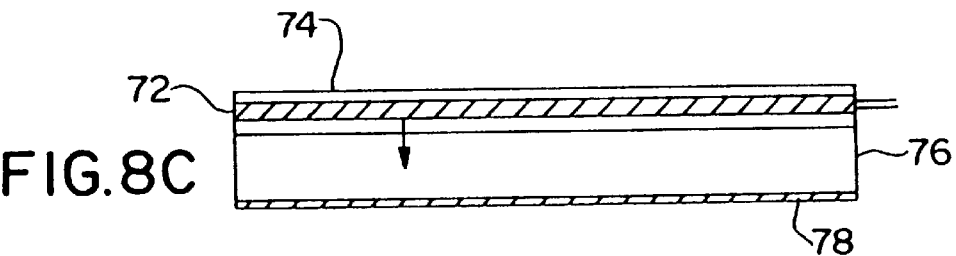
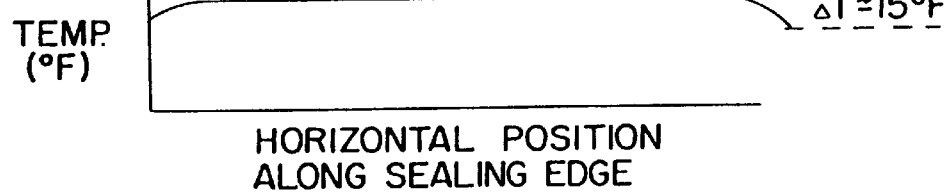

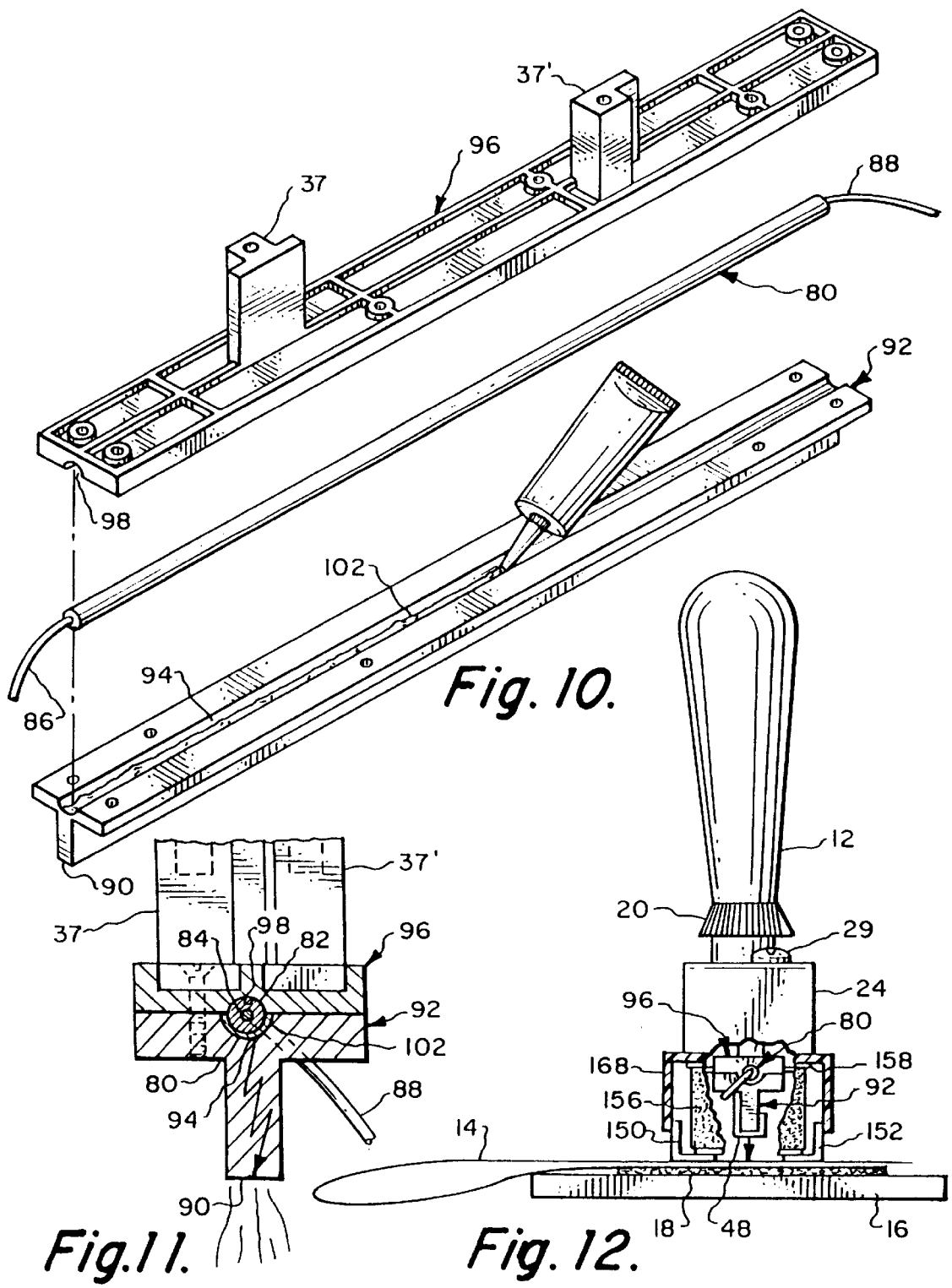

HEAT SEALING APPARATUS FOR PLASTIC BAGS

SPECIFICATION

This application is a Continuation of application Ser. No. 09/087,752 filed May 29, 1998(now U.S. Pat. No. 5,947,019).

BACKGROUND OF THE INVENTION

1. Field of the Invention

This invention relates to a portable heat sealing apparatus for plastic bags and more particularly, relates to an improved more efficient heat sealing apparatus.

2. Background Information

Plastic bags are sealed by heating the perimeter at the opening to the bag. Heat is applied across the opening, under pressure that melts the plastic and "welds" the opening of the plastic bag. There are plastic bag heat sealers that include drawing a vacuuming then sealing the opening by applying heat to melt and weld the opening together. These devices are complicated and expensive, and have jaws that are heated to melt the plastic bag opening after a vacuum has been drawn in the bag.

There is also a plastic bag heater disclosed and described in U.S. patent application Ser. No. 3,236,174 issued Feb. 22, 1966 to Hutchinson et al, one of whom is the inventor of the invention disclosed herein. This patent discloses a portable plastic bag sealer that has a sealing edge with controlled heat to seal the plastic bag my applying pressure against the opening of the plastic bag with the bag positioned on a surface. The device disclosed is simple in construction and use, and can be operated by one hand of an operator. It provides superior seals to comparable portable apparatus that were previously available.

However this device is somewhat thermally inefficient and can have some exposed outer hot surfaces as are typically exposed in the use of hot cloth irons. The heater is in the form of a T-bar that is heated by ceramic heating elements on either end. The heating elements must generate a considerable amount of heat energy to heat the entire T-bar to attain sufficient high temperature on the heating edge to seal the plastic bag. This results in the entire portable bag sealer becoming hot enough to degrade internal components and thus, shorten the sealers operating life. In addition, the inefficient heater requires substantial power to generate sufficient heat to seal a plastic bag.

It is therefore, one object of the present invention to provide an improved plastic bag sealer that provides more efficient heating of the sealing edge.

Yet another object of the present invention is to provide a plastic bag sealer having an improved heater that provides more uniform heat at lower power inputs.

Still another object of the present invention is to provide a plastic bag sealing apparatus, which reduces heat loss by preventing heat transfer to surrounding components and the surrounding atmosphere.

Still another object of the present invention is to provide a plastic bag sealing apparatus that allows small gauge insulation wire to be used that is less expensive and lasts longer when used at the reduced temperatures.

Yet another object of the present invention is to provide an improved plastic bag sealer having an improved heater that prevents transfer of heat to external components (e.g., the cover) thereby providing a safer sealer.

Yet another object of the present invention is to provide an improved plastic bag sealing apparatus with an improved heater that prevents insulating plastic parts from breaking down due to high operating temperatures.

Still another object of the present invention is to provide a plastic bag sealer having a silicon rubberized heater with embedded heater wires that are clamped in place by insulating plates alone or in conjunction with fiberglass insulation.

Still another object of the present invention is to provide a plastic bag sealing apparatus having an improved heater that provides greater heat transfer to the T-bar edge, and less heat transferred to structural components.

Yet another object of the present invention is to provide a plastic bag sealing apparatus having an improved flat silicon sheet heater having embedded heating wires that provide uniform heating over the entire length and width of the T-bar heater.

Yet another object of the present invention is to provide an improved plastic bag sealer having an improved heater utilizing thermally insulating standoffs that assists in reducing transfer of heat to surrounding components and external surfaces.

Still another object of the present invention is to provide a plastic bag sealing apparatus having an improved tubular rod heater. The improved heater will deliver uniform heat energy concentrated in the immediate area of the "T-bar" sealing edge. The rod heater design reduces the required input heat and further reduces heat energy loss to surrounding components and atmosphere.

Still another object of the present invention is to provide an improved hand-held plastic bag sealer having improved long life elastic foam support springs for resiliently supporting an elongate T-shaped heater.

Yet another object of the present invention is to provide an improved hand-held plastic bag sealer having integrally formed thermally insulating standoffs on a heater clamping plate.

BRIEF DESCRIPTION OF THE INVENTION

The purpose of the prevent invention is to provide an improved portable plastic bag sealing apparatus that is more efficient and user friendly than the model disclosed in the above identified patent.

The plastic bag heat sealing apparatus of the present invention is constructed of a T-shaped (i.e., T-bar) heating element providing a sealing edge that is covered with a replaceable channel having a non-stick, heat resistant and durable plastic coating such as polytetraflouroethylene (TEFLON). The TEFLON coating on the channel is effective to prevent the sealing apparatus from sticking to the plastic material. The top of the T-shaped heater is heated by an improved heater comprised of resilient material having an integral heating wire. The resilient heater covers the entire surface on the top of the T-bar heating element, and is clamped in place with an insulator.

A pair of rails on either side of the heating edge of the T-bar are attached by means of springs that allow the heating edge to pass through a slot formed by the rails to heat a plastic bag positioned on a non-stick surface. The heating assembly is enclosed in a housing which has a centrally located handle used to press the heater down when sealing a plastic bag.

A thermostat is provided to vary the temperature of the hot sealing edge applied to the plastic bar. The thermostat allows continuous adjusting the heat intensity according to the thickness of the plastic bags being sealed. Three different settings are provided. The first setting is for plastic bags or films from one to two mils thick. The second setting is for medium bags or films three to four mils thick. A third setting for thicker bags having plastic material that is six to ten mils thick is provided.

The resilient heater is preferably a rectangular shape of soft silicon material having a heating wire encapsulated in the material. The heating wire is incorporated in the material in a winding path along one side, and winds back along the other side. This provides uniform and even heating over the entire heater and high heat transfer to the T-bar heating element. This results in more uniform heating and lower power to achieve temperatures that provide an efficient seal.

The resilient heating element is also clamped in place, on top of the T-bar heater, and cuts stray heat loss by as much as fifty percent (50%) substantially reducing input power. The reduction in heat transfer to the surrounding components prevents cracking and damage to the components due to mechanical shock loads during rough handling.

In an optional but preferred embodiment of the invention the rails from either side of the heating edge of the T-bar heater are attached by advanced long life elastic foam support springs constructed of a urethane foam such as that known as PORON manufactured by Rogers Corporation of Connecticut. The resilient elastic foam supports do not take a compression set and therefore has a very long spring life. Further the stress loads on the hand held portable sealer are relatively light. These foam springs are an improvement over the stainless steel leaf springs, which after many repetitions, can fail. The elastic foam support springs because of the light stress loads will have a nearly infinite life.

The system is also improved with an integrally formed heater clamping plate and standoffs. The integrally formed clamping plate and standoffs are of a heat resistant thermoplastic resin such as "FORTRON" manufactured by Hoechst Celanese Corporation. This material is particularly suitable for use in electrical and electronic devices that require high heat resistance. The thermoplastic clamping plate clamps the heater in place on the T-bar heat sealing element.

In an optional embodiment a rod type heater is used that is lower in cost and more directly heats the T-bar sealing edge of the plastic bag sealer. This heater is a cylindrical rod that seats in a channel or groove in the T-bar heater directly above the heat sealing edge. The cylindrical rod heater is a heater known as a CALROD heater of General Electric Corporation or an equivalent. The cylindrical rod heater is clamped by a plate having a complimentary groove or channel to securely hold the heater in place. An insulator is provided between the heater and clamping plate. Preferably a thermally conductive lubricant or grease is provided in the T-bar channel to maximize heat transfer to the heat sealing edge.

The above and other novel features of the invention will be more fully understood from the following detailed description and the accompanying drawings, in which:

BRIEF DESCRIPTION OF THE DRAWINGS

FIG. 3 is an end view of resilient heater having an embedded heater wire.

FIG. 4 is a sectional view of an improved resilient heater illustrating the heating wire configuration.

FIG. 5 illustrates the plastic bag heat sealing apparatus positioned for sealing a plastic bag.

FIG. 6 illustrates the plastic bag heat sealing apparatus sealing a plastic bag.

FIG. 7 is an enlarged view illustrating operation of the plastic bag heat sealer taken at 7 of FIG. 6

FIGS. 8a through 8d illustrate the improved uniform heat transfer and uniform temperature profile of the new resilient silicone heater versus the old single point isolated ceramic heaters.

FIG. 10 is an exploded view illustrating an optional heater configuration for heating the T-bar sealing edge.

FIG. 11 is a sectional view illustrating the optional heater configuration of FIG. 10.

FIG. 12 is an end view similar to FIG. 5 illustrating the optional heater configuration of the plastic bag sealing apparatus positioned for sealing a plastic bag.

DETAILED DESCRIPTION OF THE INVENTION

Figure 1:
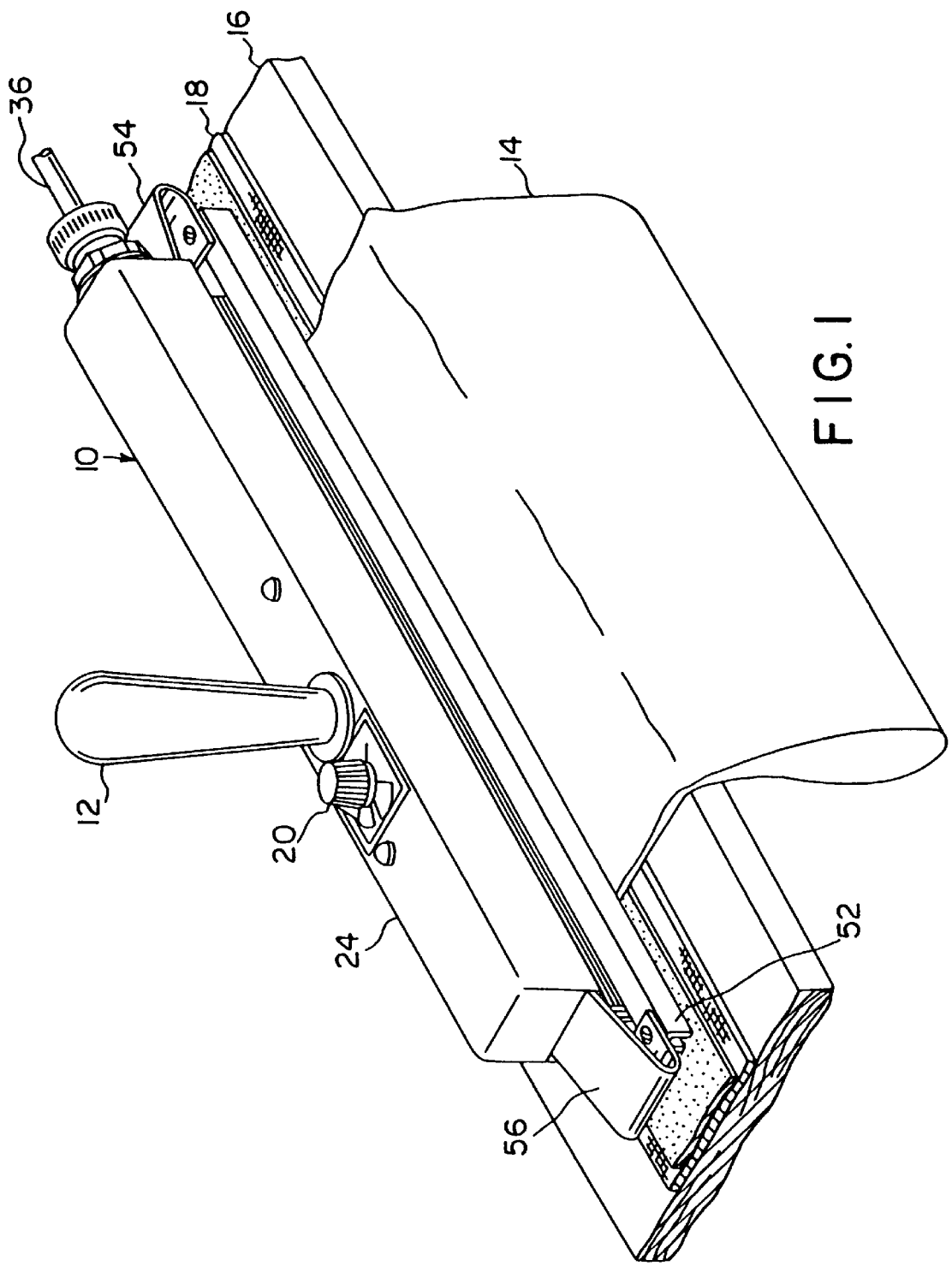
FIG. 1 is a isometric view of an improved plastic bag sealing apparatus according to the invention.

A plastic bag sealer is shown in the isometric view of FIG. 1, and is similar in design to the sealing apparatus disclosed and described in U.S. Pat. No. 3,236,174 issued Feb. 22, 1966 to Hutchinson et al. The plastic bag sealer 10 has a handle 12 for one-hand operation in sealing a plastic bag 14 lying on a table 16, or other suitable surface which includes a pad or mat 18. The temperature of sealer 10 is controlled by knob 20 which controls a thermostat as will be described in greater detail hereinafter. The operator grasps plastic bag sealer 10 by handle 12, and presses it down firmly against pad 18, on plastic bag 14. A sealing edge heats, melts thereby, seals the opening of plastic bag 14, as will be described in greater detail hereinafter.

Figure 2:
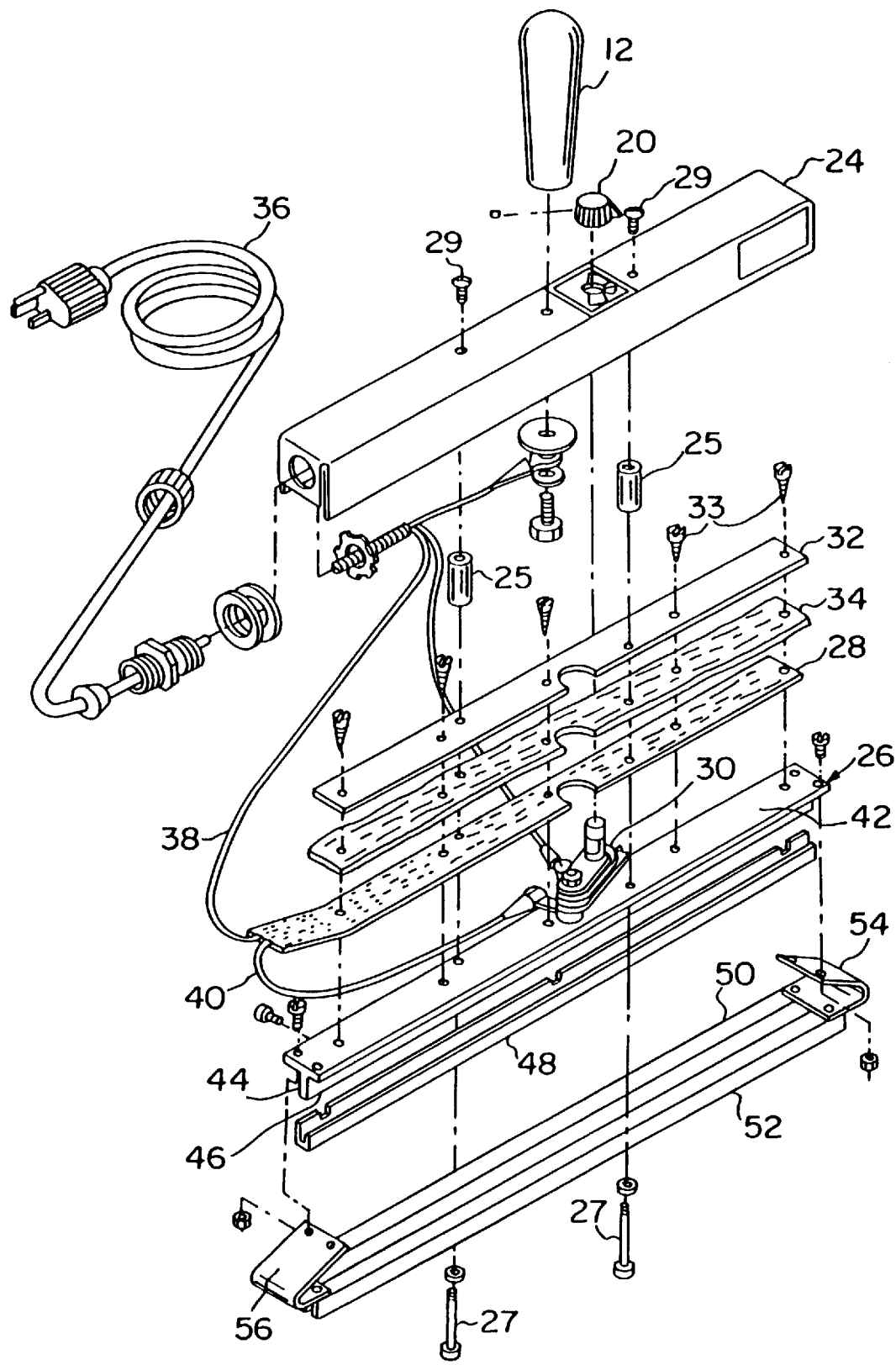
FIG. 2 is an exploded view of the heat sealing apparatus of FIG. 1.

The construction of plastic bag sealer 10 is shown in exploded view of FIG. 2. Plastic bag sealer 10 has a handle 12 as previously described; and a housing or cover 24, covering a heating element 26, heater 28, thermostat 30 and insulators 32 and 34. Plastic bag sealer 10 is connected to electrical power with cord 36. The construction and operation of plastic bag sealer 10 substantially reduces power consumption and the transfer of heat to surrounding components, allowing smaller gauge wires 38 and 40 to be used without the heavy insulation heretofore required.

Heating element 26 is in the shape of a T-bar having a flat upper surface 42, and a vertical centrally located web 44, providing a heating edge 46, covered by replaceable heating channel 48 having a heat resistant, non-stick coating 49 of TEFLON (polytetraflouroethylene) (FIG. 7). Heating element 26 is heated by rubberized silicon heater 28, as will be described in greater detail hereinafter. Heating channel 48, covering heating edge 46, remains in a normal retracted position (FIG. 5) in housing or cover 24, between rails 50 and 52, attached to upper surface 42 of heating element 26 by leaf springs 54 and 56.

Heater 28 is securely clamped, covering the entire planar surface by Micarta insulator 32, held in place by screws 33. An additional fiberglass insulator 34 may be clamped between insulator 32 and heater 28 if desired. The uniform construction and heating of heater 28 allows transfer of almost all heat to heating element 26 and heating edge 48 with heat loss and transfer to other components being minimized. Housing or cover is insulated from heating element by ligonite standoffs 25 of impregnated wood mounted by screws 27 below and screws 29 above. This keeps cover 24 from any contact with heated surfaces.

The construction of heater 28 is shown in greater detail in FIGS. 3 and 4. Heating element 28 is comprised of rubber or silicon sheets 58 and 60 having a heating wire 62 embedded between the silicon rubberized sheets 58 and 60.

The heater 28 is shown in FIG. 4 with upper silicon rubber sheet 58 removed for clarity. Heating wire 62 traverses a circuitous path down and along one edge of rectangular silicon rubberized sheet 60 to the opposite end and then back to the other end and is connected to power cord 36 by wires 38 and 40. This arrangement provides uniform heating over the entire length of heater 28. Slot 64 is provided to fit around thermostat 30, which controls the heat applied through knob 20. Thermostat 30 is preferably a short shaft model (MOD HP-84 or equivalent) bi-metal thermostat manufactured by Bimet Corporation of Morris, N.J.

The application of the device, to seal a plastic bag, is illustrated in FIGS. 5 through 7. Plastic bag 14 is placed on a suitable pad or mat 18, on a flat surface such as a table 16. Plastic bag heat sealer 10 is then placed over plastic bag 14, near the opening 15 with rails 50 and 52 resting on plastic bag 14 and heating element 26 retracted. With the appropriate amount of heat set by knob 20, plastic bag sealer 10 is pressed downward with handle 12 allowing TEFLON coated heating edge 48 to compress bag 14, heating it until it melts and welds the plastic closed as illustrated in FIG. 7. When handle 12 is released, leaf springs 54 and 56 retract heating edge 48 into housing 24 ready to seal the next plastic bag. Another plastic bag 14 is then placed on mat 18, and the process is repeated. Each plastic bag can be sealed in just a second or two.

Thermostat 30 is adjusted continuously by knob 20 to accommodate materials of different thicknesses. Preferably, three settings are provided. A first setting is for thin bags or plastic films from one to two mils thick. A second setting, at a slightly higher temperature, is provided for bags and films from three to four mils thick. A third and highest setting is provided for thick bags and films from six to ten mils thick. The thinnest bags will seal in approximately one second, with the thicker bags in the range of three to ten mils thick, will seal in one and one-half to two seconds.

FIGS. 8a through 8d are diagrams that illustrate the improved performance from the uniform heat transfer and uniform temperature profile of the resilient embedded heater versus the old type heater using single point ceramic heaters. FIGS. 8a through 8b diagrammatically illustrate the inefficient operation of the isolated ceramic heaters. Isolated ceramic heaters 66, spaced apart on T-bar 68, transfer heat to coated sealing edge 70 which when pressed down, produce the heating profile shown in FIG. 8b. Note, that the temperature gradient varies substantially (i.e., approximately 50° F.) in the areas directly beneath ceramic heaters 66. Thus, considerable heat is needed to assure a seal along the entire width of the plastic bag.

In contrast, the improved plastic bag sealer provides a more efficient transfer of heat to seal a plastic bag. Uniform resilient heater 72, securely clamped by insulating clamp 74, uniformly transfers heat to T-bar 76 and coated heating edge 78. The improved portable plastic bag sealer with the uniform resilient heater produces the heating profile shown in FIG. 8d. The resilient heater produces a uniform heat transfer and uniform temperature gradient that varies less than about 15° F. beneath the entire sealing edge 78. Since the heat transfer is relatively uniform over the area being sealed, lower heat power can be used, a more uniform seal is produced and the plastic bag sealer has less heat transfer to external surfaces making it safer.

Figure 9:
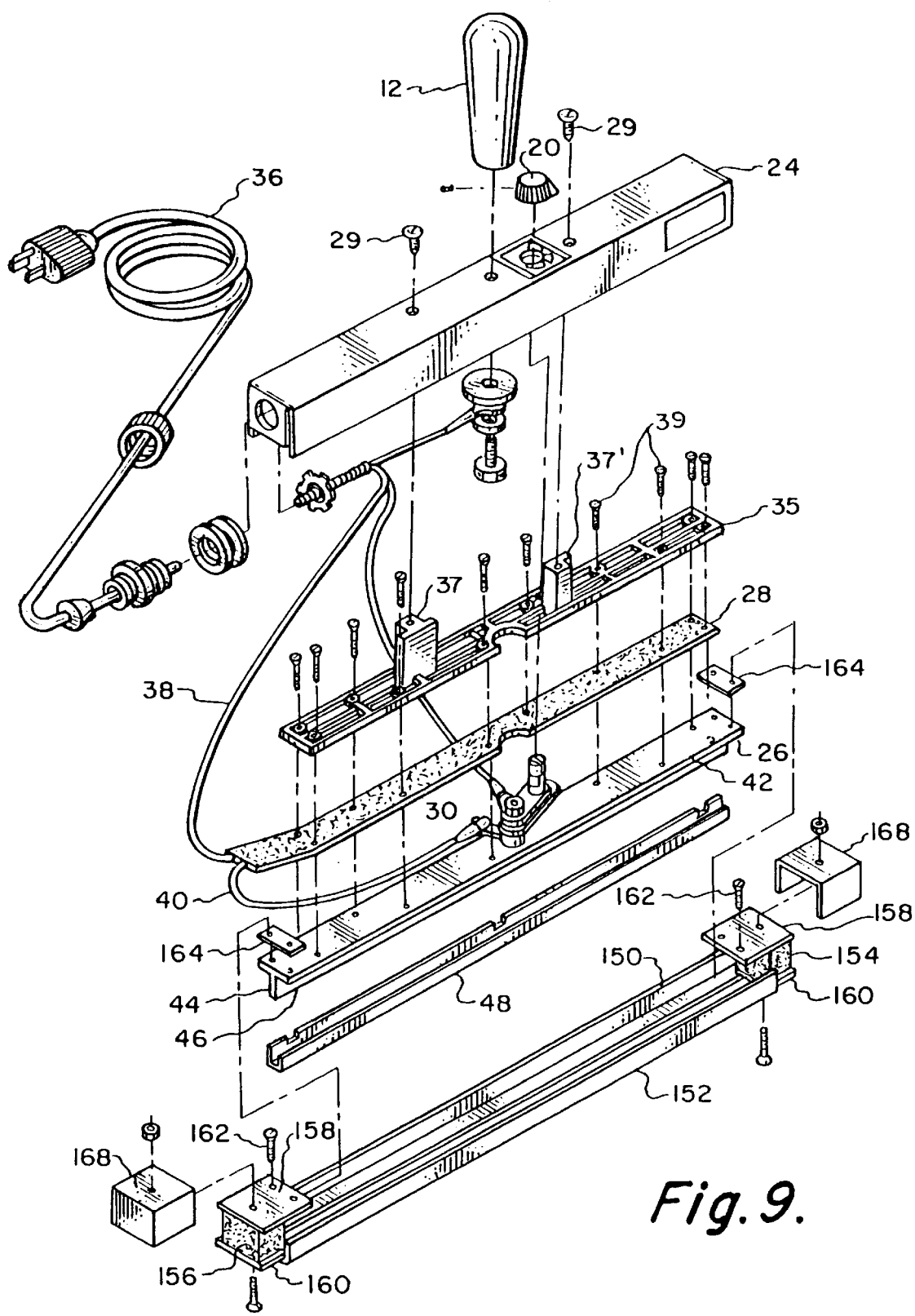
FIG. 9 is an exploded view of an optional embodiment of the heat sealing apparatus of FIG. 1.

A modified preferred embodiment of the plastic bag sealer is shown in an exploded view of FIG. 9 where like parts are indicated by like reference numbers throughout. The plastic bag sealer has handle 12, as previously described, housing or cover 24, covering heating element 26, heater 28 and thermostat 30 as before. Insulators described previously 32, 34 and standoffs 35 are replaced by an integrally formed clamping and insulating plate 35 have an integrally formed standoffs 37, 37' constructed preferably of a thermoplastic resin such as FORTRON, a PPS synthetic material manufactured by Hoechst Celanese Corporation or an equivalent. This thermoplastic resin clamping plate securely clamps heater 28 on top of heating element 42 and efficiently insulate cover 24 and handle 12 from heat. Clamping plate 35 is securely clamped on the upper flat surface of T-bar heating element 42 by screws 39 and attached to cover 24 by screws 29.

While stainless steel leaf springs 54 and 56 provide an efficient resilient mounting for rails 50 and 52 they are subject to fatigue and sometimes fail after long use. Therefore an improved mounting for rails 50 and 52 has been provided as shown in FIG. 9. Leaf springs 54 and 56 are replaced with long life resilient elastic foam supports 154 and 156 constructed of urethane foam such as PORON manufactured by Rogers Corporation of Connecticut, supporting L-shaped rails 150 and 152 by plates 158 and 160. Plate 160 is riveted to rails 150 and 152 while plates 152 are fastened to each end of heating element 26 by screws 162 and insulator 164. Elastic foam support 154 and mounting hardware is then concealed by insulating covers 168 preferably constructed from an ABS (acrylonitrile-butadiene-styrene) thermally insulating plastic.

The plastic bag sealer functions as before. A plastic bag 14 is placed on a pad 18 and heat sealer pressed down on the bag using handle 12. Urethane resilient elastic foam supports 154 and 156 at each end of rails 150 and 152 act as springs allowing edge 48 to press down and melt the plastic, welding the plastic edges together. The advantage of the urethane elastic foam support is that it does not take a compression set. It generally will have a much longer life than the stainless steel leaf springs of the first embodiment. Further since the stress loads are relatively light they will last almost indefinitely.

While the resilient planar heater of the previously described invention is more efficient than previous designs to transfer heat to the edge of the T-bar flange, a disadvantage is that it transfers substantial heat to the entire T-bar. It is also somewhat expensive to produce because the heater is embedded in a flexible planar material. Another advantageous design is the provision of a heater that can transfer more heat directly to the heating edge of the T-bar heater rather than to the entire T-bar. For that purpose an optional heater configuration has been designed.

An optional improved heater design is illustrated in FIGS. 10 through 12. In this design the flexible planar heater is replaced by a tubular rod heater 80 known as a CALROD heater of General Electric Corporation or an equivalent. The CALROD heater is a tubular metal design having a heating wire passing through the center which is packed with an electrically insulating and thermally conductive material. Heater 80 is comprised of a metal tube 82 having a heating element 84 traversing the length of the tube with electrical connections 86 and 88 at each end. Electrical connector 86 will connect to cord 36 (FIG. 9) while electrical connector 88 will connect to thermostat 30 for temperature control as before. Generally heating element 84 is embedded in a thermally conductive and electrically insulating material to conduct heat to metal tube 82.

To maximize transfer of heat from rod heater 80 to heating edge 90 of T-bar heater 92, a lengthwise groove or channel 94 is provided for receiving tubular rod heater 80. Clamping plate 96 constructed of a PPS (polyphenylene sulfite) synthetic material, such as FORTRON, manufactured by Hoechst Celanese Corporation that has a complementary groove or channel 98 to securely clamp rod heater 80 in channel 94 and direct most heat energy to heating edge 90 of the T-bar as indicated by the arrow in FIG. 11.

Tubular heater 80 is assembled in T-bar 92 by placing the tubular rod in channel 94. Preferably a thermally conductive lubricant 102 is first placed in channel 94. PPS clamping plate 96 is then securely clamped on top of tubular heater 80. This construction and configuration serves to transfer maximum amount of heat energy to sealing edge 90 of T-bar heater 92. In the configurations shown tubular heater 80 is securely clamped in arcuate channels or grooves 94 and 98 between clamping plate 96 and T-bar heater 92.

The optional configuration for heating described operates in the same manner previously described, and is shown in FIG. 12. Heating edge 90 is covered with a replaceable TEFLON coating 48 as before and positioned between rails 150 and 152 (FIG. 9) above a plastic bag 14 that is to be sealed. Plastic bag 14 is placed on a smooth surface 16 preferably having a heat insulating pad 18. To seal plastic bag 14 a downward force on handle 12 presses heated edge 90 of T-bar heater 92 against the open end of plastic bag sealed 14 melting the plastic to "weld" it together.

Thus, there has been described a plastic bag sealers, with substantial improvements over the plastic bag sealer disclosed and described in the U.S. Pat. No. 3,236,174 referred to hereinabove. The plastic bag sealer is provided with a soft silicon heater comprised of a heating wire embedded in the silicon rubber. In an optional embodiment stainless steel leaf springs are replaced with urethane elastic foam supports that act like springs but provide a longer life. The resilient urethane foam support acts similar to a spring and have a nearly indefinite life because of the light loads applied to the plastic bag sealer. In another optional embodiment a rod heater is positioned in a arcuate channel in the T-bar heating element directly above the heating edge to maximum transfer of heat energy. The tubular rod heater is clamped in a complementary grooves between the T-bar heater and a thermally insulating clamping plate. Heating temperatures and transfer of heat energy to surrounding components is substantially reduced. A reduction of up to fifty percent (50%) in power consumption to achieve the same heating temperature is achieved. The sealing edge channel is preferably TEFLON coated, and is easily replaced on the heating element. An improved sealing edge and reduction in sticking of the material can be provided by occasionally wiping the edge of the aluminum sealing channel with a rag impregnated with silicon oil. The plastic bag sealer quickly and easily seals plastic bags placed on a back-up mat, providing a good seal with limited shrinkage.

This invention is not to be limited by the embodiment shown in the drawings and described in the description which is given by way of example and not of limitation, but only in accordance with the scope of the appended claims.

What is claimed is:

1. A heat sealing apparatus for plastic materials comprising;
    a T-shaped heating element having an upper planar surface and a flange perpendicular to the planar portion forming a heating edge;
    a tubular rod heater in intimate contact with said upper planar surface of said T-shaped heating element;
    clamps means firmly clamping said tubular rod heater on top of said T-shaped heating element;
    said tubular rod heater positioned on said T-shaped heating element to maximize heat transfer to said heating edge;
    a housing covering said T-shaped heating element and said tubular rod heater;
    a handle on said housing for pressing said heating apparatus downward against a surface;
    a pair of rails mounted on either side of said heating edge forming a slot through which said heating edge may pass;
    biasing means biasing said rail over and beyond the end of said heating edge to maintain said heating edge in a retracted position until ready to use; said biasing means comprising resilient elastic foam springs supporting said pair of rails;
    means connecting said tubular rod heater to electrical power to heat said heating element and heating edge;
    whereby when said heat sealing apparatus is pressed downward on a plastic material placed on a surface, said heating edge passes through said slot between said rails and heats and seals said plastic material.

2. The apparatus according to claim 1 in which said resilient elastic foam springs are constructed of permanent set heat resistant urethane foam.

3. The apparatus according to claim 2 including a replaceable heating channel mounted over and covering said heating edge of said T-shaped heating element.

4. The apparatus according to claim 3 wherein said replaceable heating channel is coated with a heat resistant non-stick coating.

5. The apparatus according to claim 4 in which said heat resistant, non-stick coating is polytetraflouroethylene.

6. The apparatus according to claim 5 in which said clamping means comprises an insulator having the same shape as said upper planar surface securely fastened to said T-shaped heating element on top of said heater.

7. The apparatus according to claim 6 in which said clamping means comprises a clamping plate of polyphenylene sulfide.

8. The apparatus according to claim 7 including attaching means for attaching said heating element to said housing with polyphenylene sulfide standoffs to minimize heat transfer to said housing.

9. The apparatus according to claim 8 in which said standoffs are integrally formed on said clamping plate.

10. The apparatus according to claim 1 including a replaceable heating channel mounted over and covering said heating edge of said T-shaped heating element.

11. The apparatus according to claim 10 wherein said replaceable heating channel is coated with a heat resistant non-stick coating.

12. The apparatus according to claim 11 in which said heat resistant, non-stick coating is polytetraflouroethylene.

13. The apparatus according to claim 1 in which said clamping means comprises an insulator having the same shape as said upper planar surface securely fastened to said T-shaped heating element on top of said heater.

14. The apparatus according to claim 13 in which said clamping means comprises a clamping plate of polyphenylene sulfide.

15. The apparatus according to claim 14 including attaching means for attaching said heating element to said housing with polyphenylene sulfide standoffs to minimize heat transfer to said housing.

16. The apparatus according to claim 15 in which said standoffs are integrally formed on said clamping plate.

* * * * *